(12) United States Patent
Vilermo et al.

(10) Patent No.: US 12,177,623 B2
(45) Date of Patent: Dec. 24, 2024

(54) BONE CONDUCTION CONFIRMATION

(71) Applicant: Nokia Technologies Oy, Espoo (FI)

(72) Inventors: Miikka Tapani Vilermo, Siuro (FI);
Hannu Juhani Pulakka, Pirkkala (FI);
Roope Olavi Jarvinen, Lempaala (FI);
Toni Henrik Makinen, Pirkkala (FI)

(73) Assignee: Nokia Technologies Oy, Espoo (FI)

( * ) Notice: Subject to any disclaimer, the term of this patent is extended or adjusted under 35 U.S.C. 154(b) by 213 days.

(21) Appl. No.: 18/075,035

(22) Filed: Dec. 5, 2022

(65) Prior Publication Data
US 2023/0179909 A1    Jun. 8, 2023

(30) Foreign Application Priority Data

Dec. 7, 2021  (EP) ..................................... 21212683

(51) Int. Cl.
*H04R 1/10*       (2006.01)
*G10L 25/51*      (2013.01)
*H04B 13/00*      (2006.01)

(52) U.S. Cl.
CPC ............ *H04R 1/1091* (2013.01); *G10L 25/51* (2013.01); *H04B 13/005* (2013.01); *H04R 2460/13* (2013.01)

(58) Field of Classification Search
CPC ... G10L 25/51; G10L 25/06; G10L 2015/223; G10L 15/22; H04R 1/1091; H04R 2460/13; H04R 1/10; H04B 13/005
See application file for complete search history.

(56) References Cited

U.S. PATENT DOCUMENTS

| | | |
|---|---|---|
| 10,431,188 B1 | 10/2019 | Nelson et al. |
| 10,535,364 B1 * | 1/2020 | Zhong ..................... G10L 25/78 |
| 2019/0311718 A1 | 10/2019 | Huber et al. |
| 2020/0135230 A1 | 4/2020 | Tong et al. |
| 2020/0314565 A1 * | 10/2020 | Sigwanz ................ H04R 25/40 |
| 2021/0125609 A1 * | 4/2021 | Dusan .................... G10L 25/84 |

FOREIGN PATENT DOCUMENTS

WO    WO 2021/064468 A1    4/2021

* cited by examiner

*Primary Examiner* — Brian Ensey
(74) *Attorney, Agent, or Firm* — McCarter & English LLP

(57) ABSTRACT

According to an aspect, there is provided an apparatus for a wearable terminal device including circuitry configured for performing the following. The apparatus receives, via a bone conduction sensor, a bone conduction signal and, via at least one microphone over the air, an audio signal. The bone conduction signal and the audio signal are, at least in part, substantially concurrently recorded signals. The apparatus calculates a value of a similarity metric for evaluating an extent of similarity between the bone conduction and audio signals. In response to the value exceeding a pre-defined threshold, the apparatus causes performing one or more actions including executing, in response to detecting a voice command, the voice command and/or modifying, if the audio signal is received via a plurality of microphones over the air, one or more audio focusing parameters of the plurality of microphones for increasing the value of the similarity metric.

17 Claims, 5 Drawing Sheets

BONE CONDUCTION CONFIRMATION

TECHNICAL FIELD

Various example embodiments relate to wireless communications.

BACKGROUND

Nowadays many user devices possess voice recognition capabilities: cell phones, smart speakers, computers, cameras, smart watches, HMDs, cars and so on. Speech recognition is especially useful in situations where user's hands are not free, the user needs to focus on other things like driving a car or the user is located at a distance from the user device and can thus only ask questions verbally and hear answers generated, e.g., using speech synthesis. Such user devices typically respond to all spoken questions/commands equally and thus may respond also to unintentional commands or commands from wrong persons (i.e., person who are not the actually or intended user of the user device). Also, user devices typically respond to the loudest source of speech in the vicinity, not to the speech of a specific desired person.

BRIEF DESCRIPTION

According to an aspect, there is provided the subject matter of the independent claims. Embodiments are defined in the dependent claims. The scope of protection sought for various embodiments is set out by the independent claims.

According to an aspect, there is provided an apparatus for a wearable terminal device, the apparatus comprising
at least one processor, and
at least one memory for storing instructions to be executed by the processor, wherein the at least one memory and the instructions are configured to, with the at least one processor, cause the apparatus at least to perform:
receiving, via a bone conduction sensor, a bone conduction signal;
receiving, via at least one microphone over the air, an audio signal, wherein the bone conduction signal and the audio signal are, at least in part, substantially concurrently recorded signals;
calculating a value of a similarity metric for evaluating an extent of similarity between the bone conduction signal and the audio signal; and
in response to the value of the similarity metric exceeding a pre-defined threshold indicating that the bone conduction signal and the audio signal relate, at least in part, to a same segment of sound originating from a mouth of a user of the wearable terminal device, causing performing one or more actions,
wherein, if the at least one microphone consists of a single microphone, the one or more actions comprise:
  executing, in response to detecting a voice command in at least one of the audio signal and the bone conduction signal, the voice command or
if the at least one microphone comprises a plurality of microphones, the one or more actions comprise at least one of:
  executing, in response to detecting a voice command in at least one of the audio signal and the bone conduction signal, the voice command; and
  modifying one or more audio focusing parameters of the plurality of microphones for increasing the value of the similarity metric.

According to an aspect, there is provided an apparatus comprising
at least one processor, and
at least one memory for storing instructions to be executed by the processor, wherein the at least one memory and the instructions are configured to, with the at least one processor, cause the apparatus at least to perform:
receiving, via at least one microphone over the air or via said at least one communication link or network from the wearable terminal device, an audio signal;
receiving, via at least one communication link or network from a wearable terminal device comprising a bone conduction sensor, a bone conduction signal, wherein the bone conduction signal and the audio signal are, at least in part, substantially concurrently recorded signals;
calculating a value of a similarity metric for evaluating an extent of similarity between the bone conduction signal and the audio signal; and
in response to the value of the similarity metric exceeding a pre-defined threshold indicating that the bone conduction signal and the audio signal relate, at least in part, to a same segment of sound originating from a mouth of a user of the wearable terminal device, causing performing one or more actions,
wherein, if the at least one microphone consists of a single microphone, the one or more actions comprise:
  executing, in response to detecting a voice command in at least one of the audio signal and the bone conduction signal, the voice command or
  if the at least one microphone comprises a plurality of microphones, the one or more actions comprise at least one of:
  executing, in response to detecting a voice command in at least one of the audio signal and the bone conduction signal, the voice command; and
  modifying one or more audio focusing parameters of the plurality of microphones for increasing the value of the similarity metric.

The embodiments and features, if any, described in this specification that do not fall under the scope of the independent claims are to be interpreted as examples useful for understanding various embodiments.

BRIEF DESCRIPTION OF DRAWINGS

In the following, example embodiments will be described in greater detail with reference to the attached drawings, in which.

DETAILED DESCRIPTION OF SOME EMBODIMENTS

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. The embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultrawideband (UWB) technology, sensor networks, mobile ad-hoc networks (MANETs) and Internet Protocol multimedia subsystems (IMS) or any combination thereof.

The expression "communicatively connected" as used in the following may have the meaning of connected so as to enable communication (i.e., transmission and/or reception of signals) between the connected elements. Elements which are communicatively connected may be connected, for example, via one or more wired communication links, one or more wireless communication links, one or more wired communication networks and/or one or more wireless communication networks. The expression "communicatively connected" does not necessarily imply that the associated elements are electrically connected (i.e., connected via a conducting path) and/or physically connected.

Figure 1:
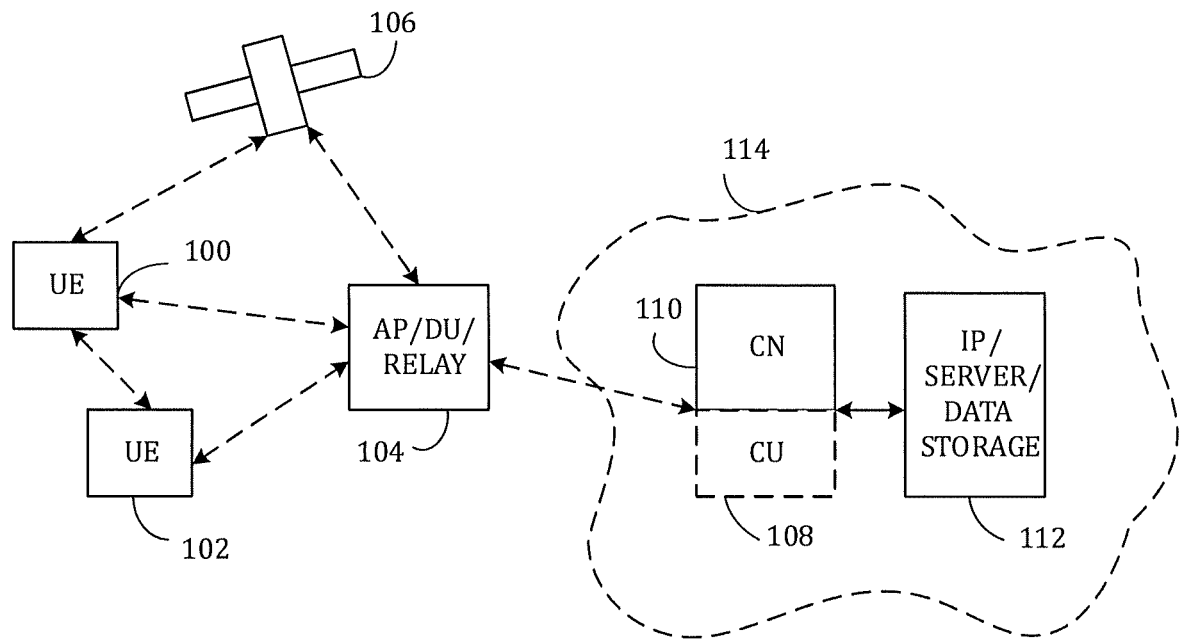
FIG. 1 illustrates an exemplified wireless communication system.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows terminal devices 100 and 102. The terminal devices 100 and 102 may, for example, be user devices. The terminal devices 100 and 102 are configured to be in a wireless connection on one or more communication channels with a node 104. The node 104 is further connected to a core network 110. In one example, the node 104 may be an access node such as (e/g)NodeB providing or serving devices in a cell. In one example, the node 104 may be a non-3GPP access node. The physical link from a terminal device to a (e/g)NodeB is called uplink or reverse link and the physical link from the (e/g) NodeB to the device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to terminal devices. The antenna unit may comprise a plurality of antennas or antenna elements. The (e/g)NodeB is further connected to the core network 110 (CN or next generation core NGC). Depending on the system, the counterpart on the CN side can be a serving gateway (S-GW, routing and forwarding user data packets), packet data network gateway (P-GW), for providing packet data connectivity of devices (UEs) to external packet data networks, or mobile management entity (MME), etc.

The terminal device (also called a user device, a UE, user equipment, a user terminal etc.) illustrates one type of an apparatus to which resources on the air interface are allocated and assigned, and thus any feature described herein with a terminal device may be implemented with a corresponding apparatus, such as a relay node. An example of such a relay node is a layer 3 relay (self-backhauling relay) towards the base station.

The terminal device typically refers to a device (e.g. a portable or nonportable computing device) that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a terminal device may also be a nearly exclusive uplink only device, of which an example is a camera or video camera loading images or video clips to a network. A terminal device may also be a device having capability to operate in Internet of Things (IoT) network which is a scenario in which objects are provided with the ability to transfer data over a network without requiring human-to-human or human-to-computer interaction, e.g., to be used in smart power grids and connected vehicles. The terminal device may also utilise cloud. In some applications, the terminal device may comprise a user portable device with radio parts (such as a watch, earphones or eyeglasses) and the computation is carried out in the cloud. The terminal device (or in some embodiments a layer 3 relay node) is configured to perform one or more of user equipment functionalities. The terminal device may also be called a subscriber unit, mobile station, remote terminal, access terminal, user terminal or user equipment (UE) just to mention but a few names or apparatuses.

Various techniques described herein may also be applied to a cyberphysical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

The technology of Edge cloud may be brought into a radio access network (RAN) by utilizing network function virtualization (NVF) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g) NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Nowadays many user devices such as cell phones, smart speakers, computers, cameras, smart watches, HMDs and cars possess voice recognition capabilities. Speech recognition is especially useful in situations where user's hands are not free, the user needs to focus on other things like driving a car or the user is located at a distance from the user device and can thus only ask questions verbally and hear answers generated, e.g., using speech synthesis. Such user devices typically respond to all spoken questions/commands equally and thus may respond also to unintentional commands or commands from wrong persons (i.e., person who are not the actually or intended user of the user device). Also, user devices typically respond to the loudest source of speech in the vicinity, not to the speech of a specific desired person.

Figure 2:
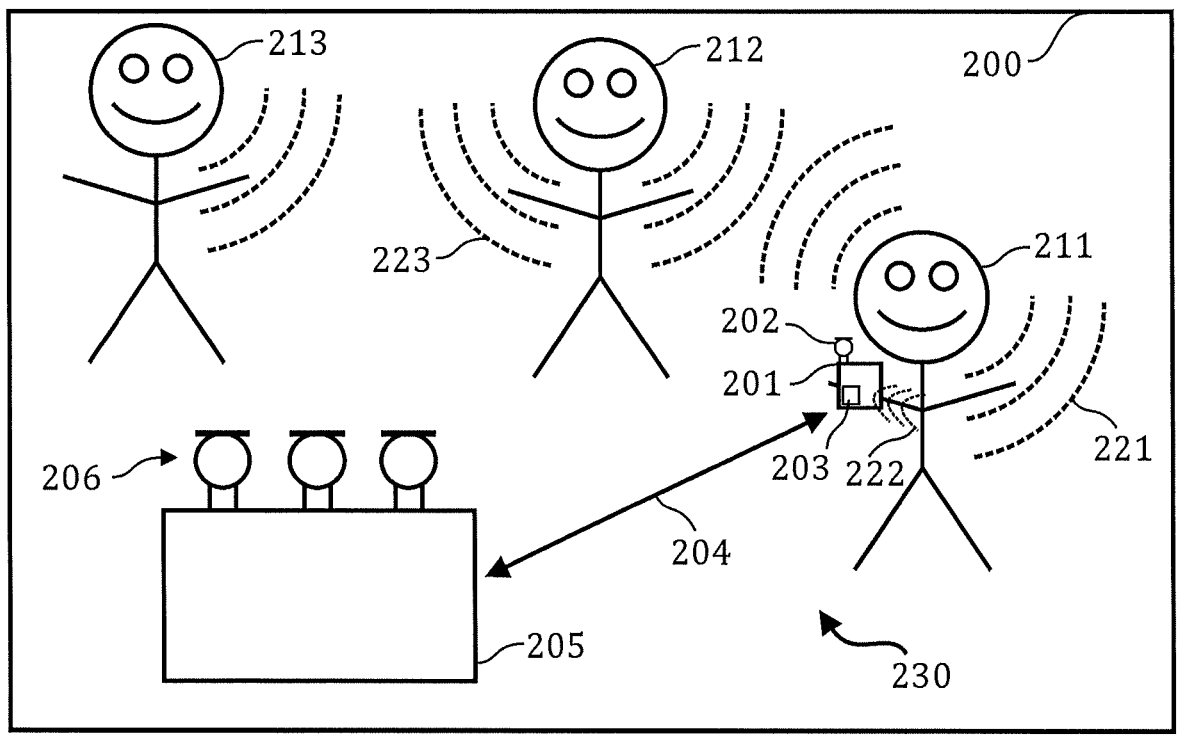
FIGS. 2, 3, 4A, 4B and 5 illustrate exemplary processes according to embodiments.

Another architecture of a system to which embodiments of the invention may be applied is illustrated in FIG. 2. FIG. 2 illustrates a simplified system architecture only showing some elements and functional entities, all being logical units whose implementation may differ from what is shown. The connections shown in FIG. 2 are logical connections; the actual physical connections may be different. It is apparent to a person skilled in the art that the systems also comprise other functions and structures.

FIG. 2 illustrates an exemplary environment 200 comprising a system 230, a user 211 and a plurality of persons 212, 213 sharing the space or environment 200 with the user 211. Said system 230 comprises at least a wearable terminal device 201 worn by the user 211 and a (non-wearable) terminal device 205.

The exemplary environment 200 may correspond, for example, to a particular room or a particular set of rooms of a house or an office or an interior of a vehicle. At least some of the plurality of persons 212, 213 may be assumed be within a speaking distance from the user 211. At least some or all of the plurality of persons 212, 213 may be speaking simultaneously at a given time, as illustrated with the acoustic wavefronts 223, resulting in a noise environment. The environment 200 may also comprise other sound sources (e.g., a television). The environment 200 may be affected by background or ambient noise (e.g., environmental noises such as water waves, traffic noise and/or alarms and/or bioacoustic noise from animals, and/or electrical noise from devices such as refrigerators, air conditioning, power supplies and/or motors). Such a noisy environment presents multiple challenges for any voice recognition functionalities of the wearable terminal device 201 and/or the terminal device 205 as any voice commands (i.e., audio signals 221) provided by the user 211 may be lost in the noise.

The wearable terminal device 201, worn in the example of FIG. 2 by the user 211, may be adapted to be worn around a wrist, around a finger, on a hand or on an arm. For example, the wearable terminal device 201 may be a smart watch, an activity tracker, a smart band, a smart bracelet or smart jewellery. The wearable terminal device 201 may correspond to one of the terminal devices 100, 102 of FIG. 1.

The wearable terminal device 201 may comprise at least one microphone 202. The at least one microphone 202 may be configured to receive audio signals 221 over the air when the user 211 is speaking. Thus, the at least one microphone 202 may be conventional non-contact microphones. Preferably, the audio signals 221 should be received irrespective of the arm position of the user 211 at the time, that is, the audio signals 221 should be received both when the wearable terminal device 201 worn by the user 211 is held close to the mouth of the user 211 and when the wearable terminal device 201 worn by the user 211 is held far from the mouth of the user 211.

In some alternative embodiments, the wearable terminal device 201 may not comprise any microphones (measuring of audio signals being handled, instead, by the terminal device 205).

Moreover, the wearable terminal device 201 comprises at least one bone conduction sensor 203 for receiving or measuring bone conduction (audio) signals. Bone conduction may be defined as conduction of sound (waves) primarily via the bones of a person. The at least one bone conduction sensor 203 may be configured at least to receive bone conduction signals 222 when the user 211 is speaking. It should be noted that as the bone conduction signals propagate within the body of the user, as opposed to over the air, the arm/hand position of the user 211 does not significantly affect the reception of the bone conduction signals 222 (i.e., the received signal strength). In other words, the bone conduction propagation distance from the mouth of the user 211 to the bone conduction sensor wearable terminal device 201 is not significantly changed by the movement of the arm of the user 211 (which is not true for the at least one microphone 202). The bone conduction sensor 203 may be, for example, a contact microphone (also known as a piezo microphone) or an accelerometer.

In some embodiments, the wearable terminal device 201 may comprise at least one display.

The wearable terminal device 201 is communicatively connected to the terminal device 205. Said communication connection 204 between the wearable terminal device 201 and the terminal device 205 may be provided, e.g., via at least one wireless or wired communication link (e.g., using Bluetooth) or via at least one wireless and/or wired communication network.

The terminal device 205 may be specifically a non-wearable terminal device (or user device or a computing device). For example, the terminal device 205 may be a smart speaker, a mobile phone, a desktop computing device, a laptop computing device, a touch-based computing device, a camera or a computing device for a vehicle (e.g., a so-called carputer). The terminal device 205 may correspond to one of the terminal devices 100, 102 of FIG. 1.

The terminal device 205 comprises a set (or an array) of one or more microphones 206. The set of one or more microphones 206 may be configured to receive or measure audio signals 221 at least when the user 211 is speaking within the environment 200. In practice, the set of one or more microphones 206 measure also other audio signals from the environment 200 such as audio signals containing speech from the plurality of persons 212, 213.

In some embodiments (such as in the illustrated example), the terminal device 205 comprises a set (or an array) 206 of microphones. In such embodiments, the terminal device may be configured to perform audio focusing or more specifically audio beamforming using said set of microphones 206. Specifically, audio focusing or audio beamforming may be employed in embodiments for implementing a (reception) beam which is focused on the wearable terminal device 201.

Audio focusing may involve amplifying or attenuating sounds received from one or more directions with respect to sounds received from other directions. Audio focusing may be implemented, for example, using a spatial filtering technique. Beamforming is one example of such a spatial filtering technique which may be used in embodiments. In general, audio (or acoustic) beamforming may involve applying different phase shifts (and possibly also adjusting relative amplitudes) at different microphones in such a way that that signals received from particular angles experience constructive interference while others experience destructive interference when the signals from set of microphones 206 are combined.

Another example of a spatial filtering technique which may be employed in embodiments is direction analysis where individual phases and/or relative amplitudes at the plurality of microphones are analyzed but not modified (in contrast to beamforming). Instead, the analysis results are used to amplify or attenuate one or more parts of the received audio signal (e.g., certain frequencies or certain time segments). Here, the attenuation or amplification may, in some cases, even be global (i.e., the same for all signals received at the plurality of microphones).

In some alternative embodiments, no terminal device 205 may be provided, that is, all the functionalities may be carried out by the wearable terminal device 201 as will be discussed in detail in the following.

In some alternative embodiments not illustrated in FIG. 2, the wearable terminal device 201 may be earphones (or equally headphones) or an earpiece (i.e., a singular earphone to be inserted into, over or onto a single ear which may or may not form a part of earphones). Any type of earphones or earpiece may be employed here. For example, the earphones may be in-ear, on-ear or over-the-ear earphones. The earphones or earpiece may be wired, wireless or true wireless. In other alternative embodiments not illustrated in FIG. 2, the wearable terminal device 201 may be adapted to be worn around a head or around a neck. The discussion provided above applies, mutatis mutandis, for the embodiments discussed in this paragraph though it should be noted, in contrast to the wearable terminal device attached to a hand or arm of a user, the distance between the mouth of the user and the earphones or earpiece or a wearable terminal device worn around a head or a neck of the user remains typically substantially constant during use.

Figure 3:
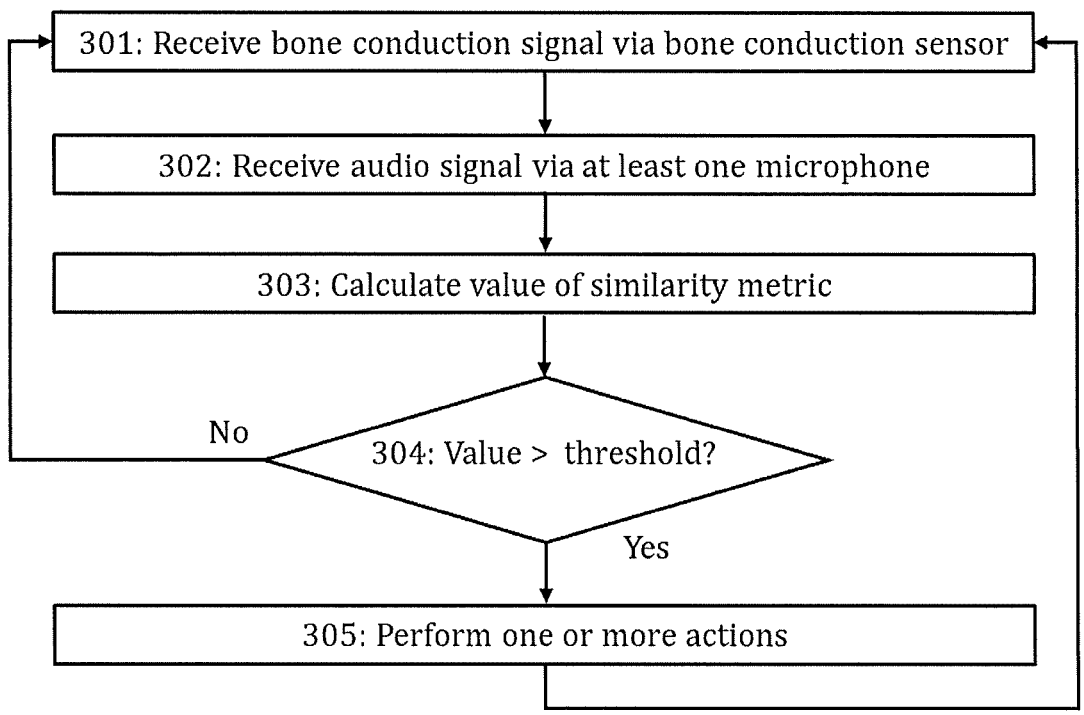

FIG. 3 illustrates a process according to embodiments for performing actions based on the detected voice of the user. The process of FIG. 3 may be carried out by a wearable terminal device comprising or being electrically connected to a bone conduction sensor and at least one microphone, such as the wearable terminal device 201 of FIG. 2, or a part thereof. It should be noted that no further device (e.g., the terminal device 205 of FIG. 2) is required for carrying out the embodiment of FIG. 3. The wearable terminal device in question may correspond to either of terminal device 100, 102 of FIG. 1. In the following discussion, the apparatus carrying out the process is called the wearable terminal device without loss of generality.

Referring to FIG. 3, the wearable terminal device receives, in block 301, a bone conduction signal via a bone conduction sensor.

The wearable terminal device receives, in block 302, via at least one microphone, an audio signal (or specifically an over-the-air audio signal). The bone conduction signal and the audio signal are, at least in part, substantially concurrently or simultaneously recorded signals (i.e., blocks 301, 302 may be carried out substantially simultaneously). In other words, the bone conduction signal comprises at least a segment substantially matching a segment of the audio signal in terms of time of recording. Here, the expression "substantially concurrently" may include at least the time difference in recording the signals resulting from different propagation speeds of the bone conduction signal and the audio signal (i.e., an acoustic wave) and different propagation paths for the two signals.

Assuming the bone conduction signal and the audio signal relate to speech of a user wearing the wearable terminal device, it should be noted that the bone conduction propagation time and speed of the bone conduction acoustic wave from the mouth of the user via the bones of the user to the bone conduction sensor differs, in general, from the propagation time of the (over-the-air) acoustic wave from the mouth of the user over the air to the at least one microphone. Thus, the exact time of the recording or measuring of a particular word spoken by the user by the bone conduction signal and the (over-the-air) audio signal may differ slightly. The term "substantially" as used in the previous paragraph encompasses such slight variations in the recording of the bone conduction signal and the (over-the-air) audio signal.

In some embodiments, the wearable terminal device may, between blocks 302 and 303, synchronize the bone conduction signal and the audio signal (assuming a pre-defined expected maximum delay window) to overcome the issue mentioned in the previous paragraph. The synchronization may involve applying a positive or negative delay to at least one of the bone conduction signal and the audio signal. The following steps of the process of FIG. 3 may, in such a case, be carried out for the modified pair of bone conduction and audio signals.

The wearable terminal device calculates, in block, 303 a value of a similarity metric for evaluating an extent of similarity between the bone conduction signal and the audio signal. The similarity metric (or equally a similarity parameter) is defined such that a high value of the similarity metric indicates that the bone conduction and audio signals correspond to the same sound (e.g., to the same voice command given by the user of the wearable terminal device). As the bone conduction signal may only relate to sounds made by the user of the wearable terminal device (i.e., to the voice of the user), a high value of the similarity metric can only be achieved if the voice of the user of the wearable terminal device is recorded in both of the bone conduction and audio signals. The similarity metric may be, for example, a cross correlation metric.

The wearable terminal device determines, in block 304, whether the value of the similarity metric exceeds a pre-defined threshold indicating that the bone conduction signal and the audio signal relate, at least in part, to a same segment of sound originating from a mouth of a user of the wearable terminal device. Said sound may typically correspond to speech produced by the user (e.g., a spoken voice command given by the user) though it may, alternatively or additionally, correspond to another mouth-based sound such as whistling, a breathing sound, a dental click or a throat-clear sound. Thus, block 304 enables recognizing a desired speaker from other speakers in the vicinity with high accuracy and without requiring a complex speaker recognition algorithm.

In response to the value of the similarity metric exceeding the pre-defined threshold in block 304, the wearable terminal device performs, in block 305, one or more (pre-defined) actions. Said one or more actions may comprise actions which depend on voice commands captured in the bone conduction and audio signals and/or actions carried out irrespective of the cognitive or verbal content of the bone conduction and audio signals.

If the process of FIG. 3 is performed by an apparatus forming a part (or a unit) of the wearable terminal device (as mentioned above as one alternative), said apparatus may specifically cause (or trigger) performing, in block 305, one or more (pre-defined) actions (by the wearable terminal device). In other words, in such embodiments, the apparatus forming a part of the wearable terminal device may not fully carry out all of the one or more actions itself.

The one or more actions may comprise executing, in response to detecting a voice command in at least one or both of the audio signal and the bone conduction signal, said voice command. The wearable terminal device may maintain, in a memory, information on a set of recognized voice commands for use in the detection.

Alternatively or additionally, assuming that the wearable terminal device comprises a plurality of microphones using which the audio signal was received, the one or more actions may comprise modifying one or more audio focusing parameters of the plurality of microphones for increasing (or maximizing) the value of the similarity metric. In other words, the wearable terminal device may adjust the reception beam so that it is better focused on the user of the wearable terminal device and, as a consequence, the wearable terminal device is able to more clearly record any voice commands issued by the user (resulting in the improvement in the value of the similarity metric). The one or more audio focusing parameters may be any parameters which have an effect on audio focusing in reception as carried out using the plurality of microphones. Each audio focusing parameter may be associated with a single microphone of the plurality of microphones or two or more microphones of the plurality of microphones.

In some embodiments, the modifying of the one or more audio focusing parameters may be based at least on the (current) value of the similarity metric and one or more previously calculated values of the similarity metric (maintained in a memory). The one or more previously calculated values of the similarity metric may relate to at least partially different focusing parameters compared to the current value of the similarity metric.

Additionally or alternatively, the modifying of the one or more audio focusing parameters of the plurality of microphones may comprise causing performing one or more further measurements of bone conduction signals and audio signals using at least partially different focusing parameters and basing the adjustment of the one or more audio focusing parameters also on one or more values of the similarity metric calculated based on said further measurements.

As described in connection with FIG. 2, the audio focusing may correspond, in some embodiments, specifically to audio beamforming. Thus, said one or more audio focusing parameters may comprise or consist of one or more audio beamforming parameters. Said one or more audio beamforming parameters may comprise, for example, one or more phase shifts and/or one or more gains applied to one or more signals to be inputted to one or more of the plurality of microphones, respectively.

The beamforming as used in embodiments may correspond to fixed or switched beam beamforming or adaptive beamforming. In some embodiments, machine learning-based adaptive beamforming (e.g., based on neural networks or deep learning neural networks) may be employed.

Alternatively or additionally, the one or more actions may comprise actions performance of which is dependent on the amplitude and/or delay of the recorded audio signal and/or of the recorded bone conduction signal, as will be discussed in more detail in connection with FIG. 5.

In response to the value of the similarity metric failing to exceed the pre-defined threshold in block 304, the wearable terminal device may ignore the bone conduction and audio signals (i.e., do nothing) as it is highly probable that the audio signal and the bone conduction signal do not contain any speech of the user.

Figure 4A:
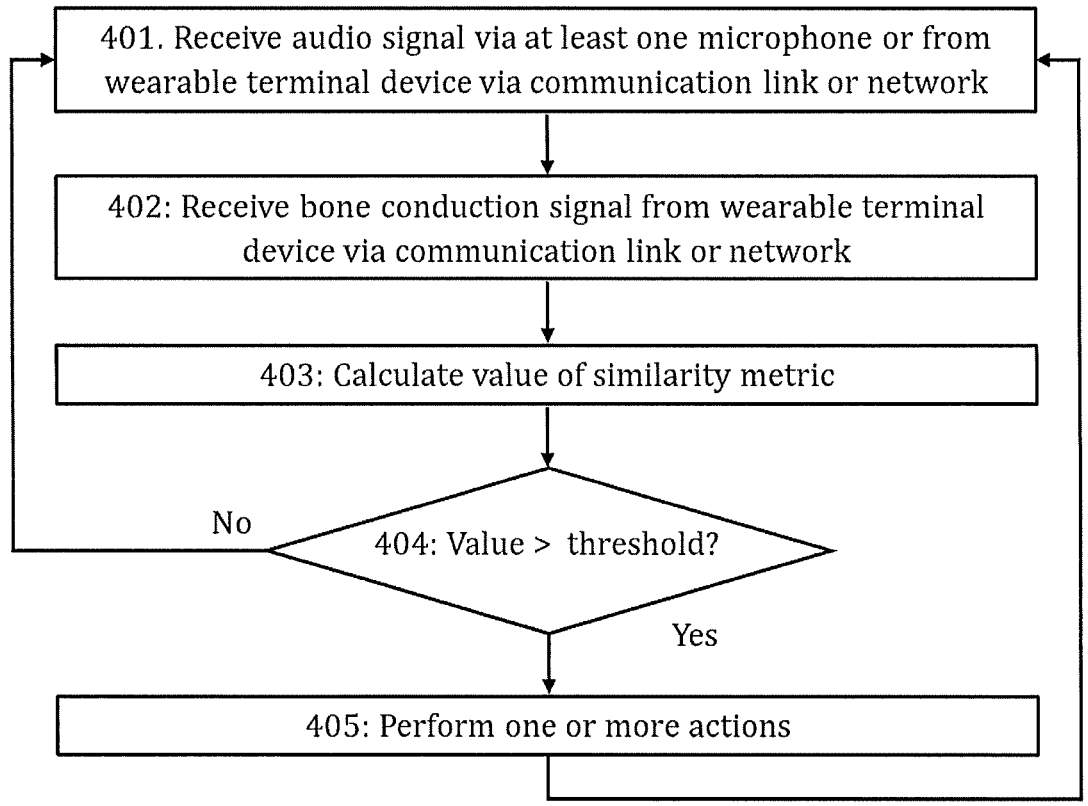
Figure 4B:
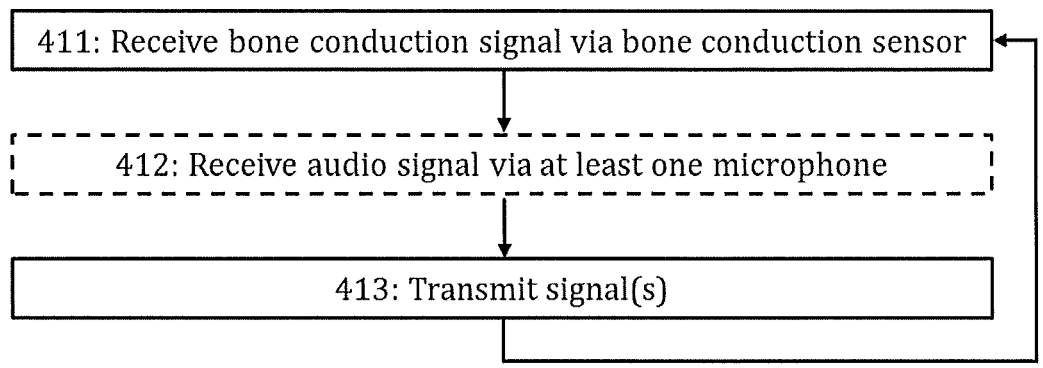

FIGS. 4A and 4B illustrate processes according to embodiments for performing actions based on the detected voice of the user. The process of FIG. 4A may be carried out by a terminal device comprising or being electrically connected to one or more microphones and being communicatively connected to a wearable terminal device comprising a bone conduction sensor. Said terminal device may correspond to the terminal device 205 of FIG. 2 and/or to either of the terminal devices 100, 102 of FIG. 1. The process of FIG. 4B may be carried out by a wearable terminal device comprising or being electrically connected to a bone conduction sensor, such as the wearable terminal device 201 of FIG. 2, and being communicatively connected to a terminal device configured to carry out the process of FIG. 4A. The wearable terminal device in question may correspond to either of terminal device 100, 102 of FIG. 1. In some embodiments, the process of FIGS. 4A and 4B may be carried out, respectively, by a part of said terminal device and a part of said wearable terminal device. In the following discussion, the apparatuses carrying out the process of FIGS. 4A and 4B are called the terminal device and the wearable terminal device, respectively.

It should be noted that many of actions discussed in connection with FIGS. 4A and 4B correspond, to a large extent, to actions of the process of FIG. 3 (though, e.g., the entity performing may differ). Thus, any of the definitions provided in connection with FIG. 3 may apply, mutatis mutandis, to corresponding features of FIGS. 4A and 4B.

Referring to FIG. 4A, it may be initially assumed the terminal device (e.g., a smart speaker) is paired with the wearable terminal device. The terminal device receives, in block 401, an audio signal via at least one microphone of the terminal device over the air or via at least one communication link and/or at least one communication network from the wearable terminal device. In the latter case, the audio signal may have been originally measured or recorded by the wearable terminal device. Said at least one communication link and/or at least one communication network may comprise at least one wireless communication link and/or at least one wireless communication network.

Then, the terminal device receives, in block 402, a bone conduction signal via said at least one communication link and/or at least one communication network from the wearable terminal device (which comprises a bone conduction sensor). The bone conduction signal and the audio signal are, at least in part, substantially concurrently recorded signals, similar to as discussed in connection with FIG. 3. Here, the expression "substantially concurrently" may include at least the time difference in recording the signals resulting from differing distances between the sound source (i.e., the mouth of the user) and the terminal device and between the sound source and the wearable terminal device and different propagation speeds of the bone conduction signal and the audio signal (i.e., an acoustic wave).

In some embodiments, synchronization between the audio signal and the bone conduction signal may be carried out between blocks 402, 403, similar to as discussed in connection with FIG. 3.

The terminal device calculates, in block 403, a value of a similarity metric for evaluating an extent of similarity between the bone conduction signal and the audio signal. The terminal device determines, in block 404, whether the value of the similarity metric exceeds a pre-defined threshold indicating that the bone conduction signal and the audio signal relate, at least in part, to a same segment of sound originating from a mouth of a user of the wearable terminal device. The actions relating to blocks 403, 404 may correspond fully to actions discussed above in connection with blocks 303, 304 of FIG. 3 (though the actor is different).

In response to the value of the similarity metric exceeding a pre-defined threshold in block 404, the terminal device performs, in block 405, one or more actions. Said one or more actions may comprise actions which depend on voice commands captured in the bone conduction and/or audio signals and/or actions carried out irrespective of the cognitive or verbal content of the bone conduction and audio signals.

The one or more actions may comprise executing, in response to detecting a voice command in at least one or both of the audio signal and the bone conduction signal, said voice command. The terminal device may maintain, in a memory, information on a set of recognized (or recognizable) voice commands for use in the detection. Executing the voice command may comprise, for example, playing or stopping a particular sound or piece of music, playing or stopping playing a particular video, opening or closing an application, turning volume up or down, turning a display on or off, switching off the wearable terminal device, switching the wearable terminal device to a particular mode (e.g., a stand-by mode), making a web search using a web search engine based on the voice command, displaying information on a screen, providing a reply to a query defined by the voice command using a voice synthesizer and/or via the display, calling a particular number based on the voice command or any combination thereof.

Alternatively or additionally, assuming that the terminal device comprises a plurality of microphones using which the audio signal was received, the one or more actions may comprise modifying one or more audio focusing parameters (or specifically one or more audio beamforming parameters) of the plurality of microphones for increasing (or maximizing) the value of the similarity metric. In other words, the terminal device may adjust the reception beam so that it is better focused on the user of the wearable terminal device (being also the user or owner of the non-wearable terminal device). As a consequence, the voice of the user is amplified relative to other voices or noises in the environment and the terminal device is able to more clearly record any voice commands issued by the user (resulting in an improvement in the value of the similarity metric).

Alternatively or additionally, assuming that both the bone conduction signal and the audio signal were recorded by the wearable terminal device and subsequently communicated to the terminal device, the one or more actions may comprise actions performance of which is dependent on the (relative) amplitudes (or signal levels) and/or the delays of the recorded audio signal and the bone conduction signal (i.e., on the distance between the mouth of the user and the wearable terminal device), as will be discussed in more detail in connection with FIG. 5.

In response to the value of the similarity metric failing to exceed the pre-defined threshold in block 404, the terminal device may ignore the bone conduction and audio signals (i.e., do nothing) as it is highly probable that the audio signal and the bone conduction signal do not contain any speech of the user.

As mentioned above, the process of FIG. 4B correspond to a process carried out by a wearable terminal device while the (non-wearable) terminal device (e.g., a smart speaker) performs the process of FIG. 4A. The process of FIG. 4B is notably simpler compared to the process of FIG. 3 as some of the functionalities have been "outsourced" to the (non-wearable) terminal device.

Referring to FIG. 4B, the wearable terminal device receives, in block 411, a bone conduction signal via the bone conduction sensor of the wearable terminal device.

Optionally, the wearable terminal device may also receive, in block 412, an audio signal via at least one microphone of the wearable terminal device. The bone conduction signal and the audio signal are, at least in part, substantially concurrently recorded signals. As described above, the audio signal may be, alternatively or additionally, recorded by the terminal device using its own microphone (s).

The wearable terminal device transmits, in block 413, at least the bone conduction signal to the terminal device via said at least one wireless or wired communication link or network. Optionally, also the audio signal recorded by the wearable terminal device may be transmitted in block 413 (assuming that such a signal was recorded in the first place).

Figure 5:
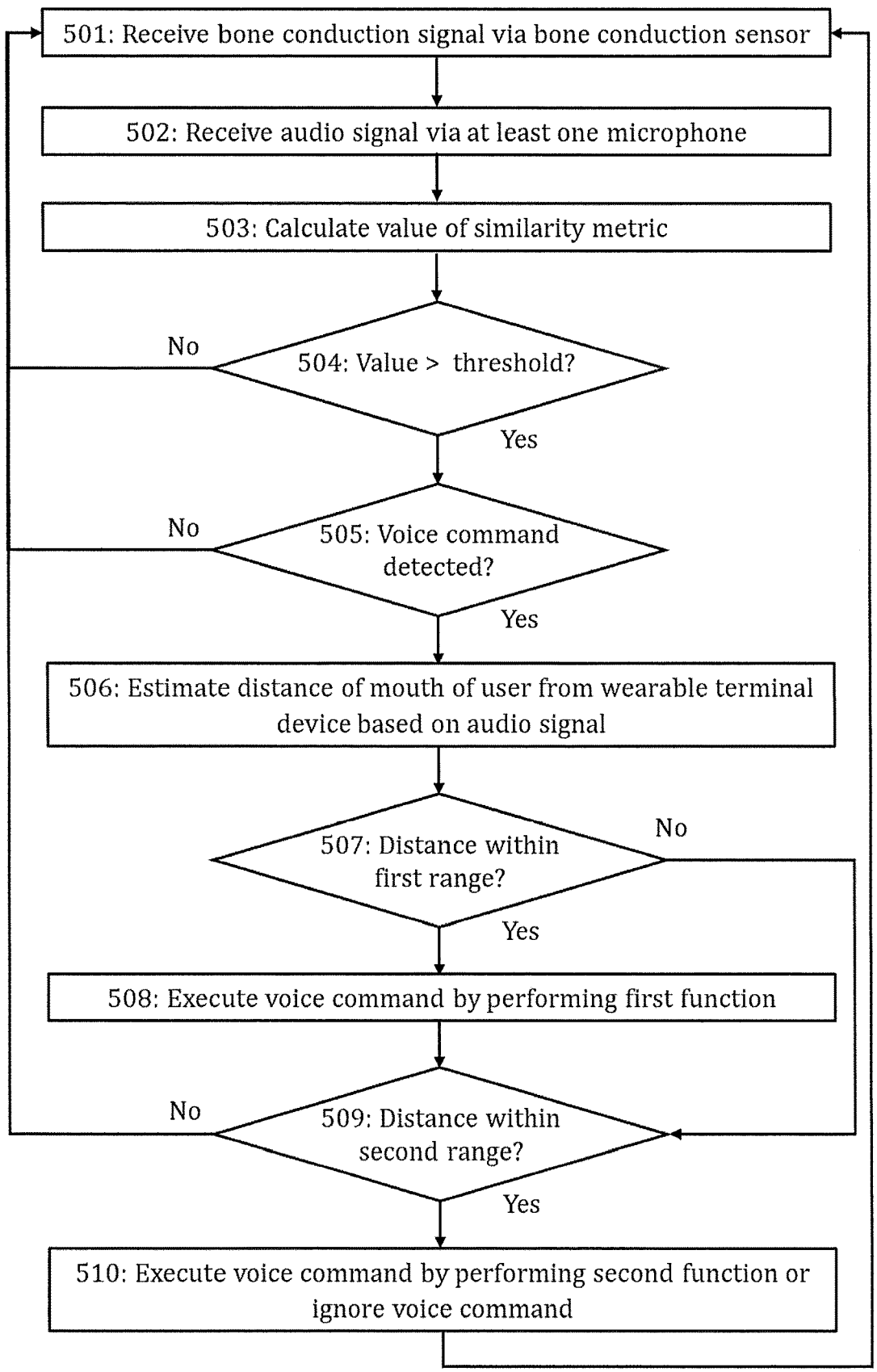

FIG. 5 illustrates another process according to embodiments for performing actions based on the detected voice of the user. The process of FIG. 5 may be carried out by a wearable terminal device comprising or being electrically connected to a bone conduction sensor and at least one microphone, such as the wearable terminal device 201 of FIG. 2, or a part thereof. The wearable terminal device may specifically be assumed to be worn by a user around a wrist, around a finger, on a hand or on an arm in the embodiments discussed in connection with FIG. 5. It should be noted that no further device (e.g., the terminal device 205 of FIG. 2) is required for carrying out the embodiment of FIG. 5. The wearable terminal device in question may correspond to either of terminal device 100, 102 of FIG. 1. In the following discussion, the apparatus carrying out the process is called the wearable terminal device without loss of generality.

The process of FIG. 5 may be considered one more detailed implementation of the process of FIG. 3 discussed above. The initial steps of the process of FIG. 5 illustrated with blocks 501 to 504 may correspond fully to actions described above in connection with blocks 301 to 304 of FIG. 3 and are thus not repeated for brevity.

Following the determination in block 504 that the value of the similarity metric exceeds the pre-defined threshold (indicating that the bone conduction and the audio signal comprise voice of the user), the wearable terminal device determines, in block 505, whether a (known) voice command is comprised in the audio and/or bone conduction signal.

In response to detecting the voice command in the audio and/or bone conduction signal in block 505, the wearable terminal device estimates, in block 506, a distance of a mouth of the user from the wearable terminal device based on (relative) amplitudes (or signal levels) or delays of the audio signal and the bone conduction signal (or difference thereof). This estimation may be based on the known rate at which the amplitude of the acoustic wave attenuates as it propagates in air and/or bone and/or the known speed of the acoustic wave in air and/or bone.

The estimation in block 506 may be based on the following considerations. The bone conduction signal has close to the same amplitude irrespective of the hand and/or arm position of the user of the wearable terminal device (attached to the arm or hand) as the distance that the conduction signal has to travel through the body of the user is always (at least approximately) the same. However, the amplitude of the audio signal and the delay of the audio signal varies significantly, as acoustic waves travel over the air and the distance between the mouth of the user differ considerably if the user is holding the wearable terminal device next to his/her mouth and when the user is holding the wearable terminal device as far away from his/her mouth as possible. The relative amplitude (or signal level) and/or delay difference of the audio signal (from the mouth of the user to the at least one microphone of the wearable terminal device) and the bone conduction signal (from the mouth of the user to the bone conduction sensor of the wearable terminal device) may be used, in block 506, for estimating how far the wearable terminal device is from the mouth of the user. If the delays for the audio and bone conduction signals are approximately the same, the user may be assumed to be holding his arm straight. If the audio signal arrives sooner than bone conduction signal, the user may be assumed to be holding his arm folded so that the wearable terminal device is close to his/her mouth. If the amplitude of the audio signal is higher than normal when compared to the amplitude of the bone conduction signal, the user may be assumed to be holding the wearable terminal device close to his/her mouth.

It should be noted that this way of estimating the distance provides the benefit of being capable of distinguishing between the case where the wearable terminal device is far from the mouth of the user and the case where the user is just talking quietly. The voice level of the user does not affect the result of determination in block 506 as only the difference between the bone conduction and audio signal levels or delays is used (not the raw signals as such).

In response to the estimated distance being within a first pre-defined distance range in block 507, the wearable terminal device executes, in block 508, the voice command based on the audio signal and/or the bone conduction signal by performing a first function. The first pre-defined distance range may be defined to comprise distances from a first pre-defined lower distance to a first pre-defined upper distance. The first lower distance may be zero. In other words, the first function may be performed if the wearable terminal device is positioned (or held) sufficiently near to the mouth of the user when the voice command is given (e.g., the user may be speaking directly to the wearable terminal device). The first function may, in general, correspond to any of the actions listed in connection with block 305 of FIG. 3.

The first pre-defined upper distance of the first pre-defined distance range may be defined so that it may be assumed that the mouth of the user is within a viewing distance of a display of the wearable terminal device when the estimated distance is within the first pre-defined distance range. The first function may, then, comprise displaying information on the display of the wearable terminal device. For example, if the user says "What's the weather like?", the wearable terminal device may display a weather report on the display of the wearable terminal device (where the weather report may be based on an Internet query).

In response to the estimated distance not being within the first pre-defined distance range in block 507, the process proceeds to block 509. At least in some embodiments, the process may proceed to block 509 also following the execution of the voice command by performing the first function in block 508. In some alternative embodiments (not shown in FIG. 5), the process may proceed back to block 501 following the execution of the voice command by performing the first function in block 508.

In response to the distance being within a second pre-defined distance range at least partially different from the first pre-defined distance range in block 509, the wearable terminal device executes, in block 510, the voice command based on the audio signal and/or the bone conduction signal by performing a second function different from the first function or ignoring the voice command. The second pre-defined distance range may be defined to comprise distances from a second pre-defined lower distance to a second pre-defined upper distance (a bounded range) or to infinity (a half-bounded range). The first and second pre-defined distance ranges may be defined to be overlapping or non-overlapping. In the latter case, the second pre-defined distance range may be defined to be above the first pre-defined upper distance.

To give a more specific example, the second pre-defined distance range may be a half-bounded distance range comprising all distances not within the first pre-defined distance range (which is defined to start at zero). The first and second pre-defined distance ranges may, thus, encompass together all (non-negative) distances. The second function may, then, be performed always when the wearable terminal device is positioned (or held) sufficiently far from the mouth of the user when the voice command is given.

For example, if the user says the aforementioned phrase "What's the weather like?" while the wearable terminal device is positioned far from the mouth of the user, the wearable terminal device may provide a voice response comprising a weather report using a voice synthesizer (where the weather report may be based on an Internet query), instead or in addition to displaying corresponding information on the display of the wearable terminal device. Thus, in general, if the voice command is of a first type (such as "What's the weather type?"), the first function may be defined as causing displaying information on a screen of the wearable terminal device and/or the second function may be defined as playing a sound or speech via at least one speaker comprised in or electrically and/or communicatively connected to the wearable terminal device, where said information or said sound or speech is dependent on the voice command. Said at least one speaker may comprise at least one internal speaker of the wearable terminal device and/or at least one external speaker such as a dedicated speaker paired with the wearable terminal device (e.g., using Bluetooth) or a (terminal) device electrically or communicatively connected to the wearable terminal device (being, e.g., a wearable terminal device adapted to be worn around a wrist, on a hand, around a finger or on an arm). To give an example of the latter alternative, said at least one speaker may comprise at least one speaker of wired, wireless or truly wireless headphones or a wired, wireless or truly wireless earpiece worn by the user.

It may be assumed at least with certain voice commands that if the voice command is given when the wearable terminal device is held close to the mouth of the user, the voice command is directed directly towards the wearable terminal device and thus immediate action should be taken. For example, if the user says: "How can I increase volume?" when the wearable terminal device is positioned close to the mouth of the user (block 507, yes), the wearable terminal device may just increase the volume of the wearable terminal device in block 508. On the other hand, if the user says: "How can I increase volume?" when the wearable terminal device is positioned far from the mouth of the user (block 507, yes), the wearable terminal device may present search results for increasing volume in at least one device other than the wearable terminal device in block 510. Thus, in general, if the voice command is of a second type (such as "How can I increase volume?"), the first function may be defined as directly executing the voice command (i.e., carrying out the task explicitly defined in the voice command) and/or the second function may be defined as causing displaying information on a screen of the wearable terminal device, where said displayed information is dependent on the voice command.

To give yet another example of this scenario, if the user says: "Stop that!" when the wearable terminal device is positioned close to the mouth of the user (block 507, yes), the wearable terminal device may terminate or interrupt one or more of its present on-going actions (e.g., stop playing music or hang up a phone call). On the other hand, if the user says: "Stop that!" when the wearable terminal device is positioned far from the mouth of the user (block 507, yes), the wearable terminal device may assume that the voice command was not addressed to the wearable terminal device and simply ignore the voice command in block 510.

In some embodiments, the relative order between blocks 507 & 508 and blocks 509 & 510 may be different (i.e., the second pre-defined distance range may evaluated first).

In some embodiments, only one of the features discussed in connection with blocks 507 & 508 and with blocks 509 & 510 may be implemented. For example, the wearable terminal device may be configured, in some embodiments, only to react to voice commands which correspond to the first or second pre-defined distance range.

In some embodiments, blocks 508 and 510 may be swapped. In other words, the voice command may be executed by performing the second function or alternatively the voice command may be ignored following the positive evaluation in block 507 (using the first pre-defined distance range) and the voice command may be executed by performing the first function following the positive evaluation in block 509 (using the second pre-defined distance range).

Figure 6:
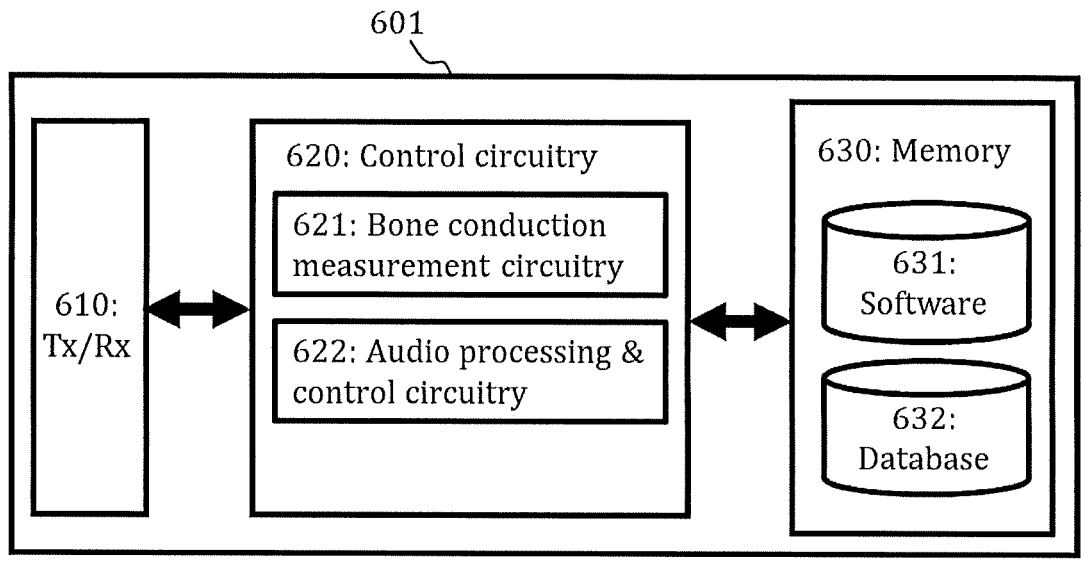
FIGS. 6 and 7 illustrate apparatuses according to embodiments.

FIG. 6 shows an apparatus 601 (e.g., a computing device) according to some embodiments. The apparatus 601 may be a wearable terminal device (e.g., the terminal device 100, 102 of FIG. 1 and/or the wearable terminal device 201 of FIG. 2) or a part thereof. FIG. 6 may illustrate an apparatus configured to carry out at least the functions described above in connection with the wearable terminal device. The apparatus 601 may comprise one or more control circuitry 620, such as at least one processor, and at least one memory 630, including one or more algorithms, such as a computer program code (software 631) wherein the at least one memory and the computer program code (software) are configured, with the at least one processor, to cause, respectively, the apparatus to carry out any one of the exemplified functionalities of the wearable terminal device as described above.

Referring to FIG. 6, the control circuitry 620 of the apparatus 601 comprises at least bone conduction measurement circuitry 621. The bone conduction measurement circuitry 621 may be configured to carry out at least the functionalities described above by means of any of block 301 of FIG. 3, block 402 of FIG. 4A and block 501 of FIG. 5 using one or more individual circuitries. The control circuitry 620 of the apparatus 601 further comprises audio processing and control circuitry 622. The audio processing and control circuitry 622 may be configured to carry out any of the functionalities described above in connection with any of FIGS. 3, 4B and 5, apart from said block 301 of FIG. 3, block 402 of FIG. 4A and block 501 of FIG. 5, using one or more individual circuitries.

The at least one memory 630 may comprise at least one database 632 which may comprise, for example, information on the pre-defined threshold for the similarity metric. Each memory 630 may comprise software 631 and at least one database 632. The memory 630 may also comprise other databases which may not be related to the functionalities of the apparatus according to any of presented embodiments. The at least one memory 630 may be implemented using any suitable data storage technology, such as semiconductor based memory devices, flash memory, magnetic memory devices and systems, optical memory devices and systems, fixed memory and removable memory.

Referring to FIG. 6, the apparatus 601 may further comprise different interfaces 610 such as one or more communication interfaces (TX/RX) comprising hardware and/or software for realizing communication connectivity over one or more communications network according to one or more communication protocols. Specifically, the one or more communication interfaces 610 may provide the apparatus with communication capabilities to communicate in one or more mobile network and enable communication with one or more access nodes, one or more terminal devices (via said plurality of access nodes or directly), one or more other network nodes or elements and/or an apparatus 701 of FIG. 7. The one or more communication interfaces 610 may comprise standard well-known components such as an amplifier, filter, frequency-converter, analog-to-digital converts, (de)modulator, and encoder/decoder circuitries, controlled by the corresponding controlling units, and one or more antennas.

Figure 7:
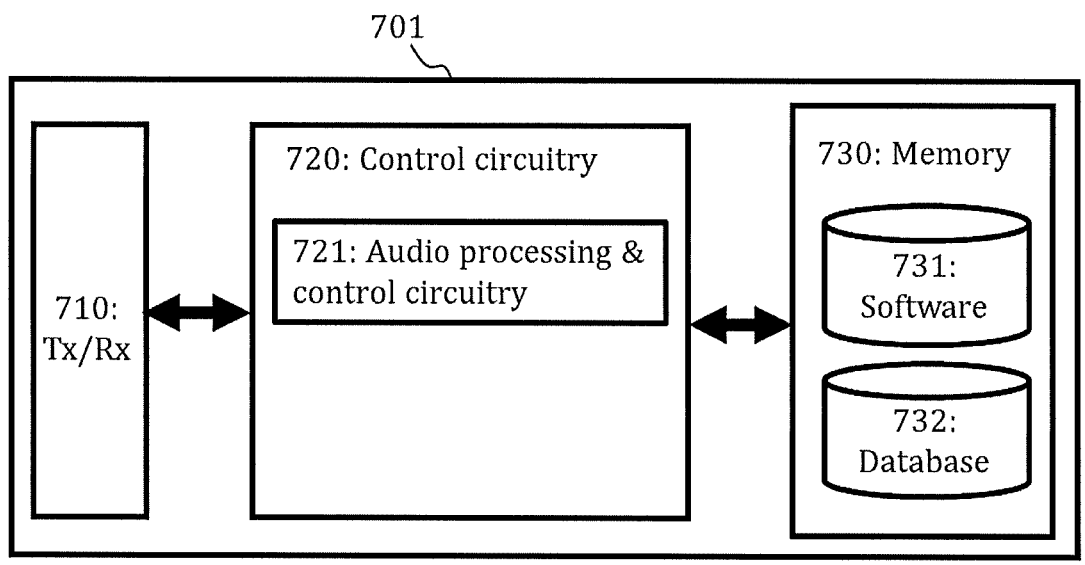

FIG. 7 shows an apparatus 701 according to some embodiments. The apparatus 701 may be a terminal device (e.g., the terminal device 100, 102 of FIG. 1 and/or the terminal device 205 of FIG. 2) or a part thereof. The apparatus 701 may be configured to carry out at least the functions described above in connection with the (non-wearable) terminal device communicatively connected to a wearable terminal device. The apparatus 701 may comprise one or more control circuitry 720, such as at least one processor, and at least one memory 730, including one or more algorithms 731, such as a computer program code (software) wherein the at least one memory and the computer program code (software) are configured, with the at least one processor, to cause the apparatus to carry out any one of the exemplified functionalities of the terminal device described above.

Referring to FIG. 7, the control circuitry 720 of the apparatus comprises at least audio processing & control circuitry 721. The audio processing & control circuitry 721 may be configured to carry out at least some of the functionalities described above by means of FIG. 4A using one or more individual circuitries.

The at least one memory 730 may comprise at least one database 732 which may comprise, for example, information on a pre-defined threshold for the similarity metric. Each memory 730 may comprise software and at least one database. The at least one memory 730 may also comprise other databases which may not be related to the functionalities of the apparatus according to any of presented embodiments. The at least one memory 730 may be implemented using any suitable data storage technology, such as semiconductor based memory devices, flash memory, magnetic memory devices and systems, optical memory devices and systems, fixed memory and removable memory.

Referring to FIG. 7, the apparatus may further comprise different interfaces 710 such as one or more communication interfaces (TX/RX) comprising hardware and/or software for realizing communication connectivity over one or more communications network according to one or more communication protocols. Specifically, the one or more communication interfaces 710 may provide the apparatus with communication capabilities to enable communication with one or more terminal devices, one or more wearable terminal devices, one or more access nodes and/or an apparatus 601 of FIG. 6. The one or more communication interfaces 710 may comprise standard well-known component(s) such as an amplifier, filter, frequency-converter, analog-to-digital converts, (de)modulator, and encoder/decoder circuitries, controlled by the corresponding controlling units, and/or one or more antennas.

As used in this application, the term 'circuitry' may refer to one or more or all of the following: (a) hardware-only circuit implementations, such as implementations in only analog and/or digital circuitry, and (b) combinations of hardware circuits and software (and/or firmware), such as (as applicable): (i) a combination of analog and/or digital hardware circuit(s) with software/firmware and (ii) any portions of hardware processor(s) with software, including digital signal processor(s), software, and memory(ies) that work together to cause an apparatus, such as a terminal device or an access node, to perform various functions, and (c) hardware circuit(s) and processor(s), such as a microprocessor(s) or a portion of a microprocessor(s), that requires software (e.g. firmware) for operation, but the software may not be present when it is not needed for operation. This definition of 'circuitry' applies to all uses of this term in this application, including any claims. As a further example, as used in this application, the term 'circuitry' also covers an implementation of merely a hardware circuit or processor (or multiple processors) or a portion of a hardware circuit or processor and its (or their) accompanying software and/or firmware. The term 'circuitry' also covers, for example and if applicable to the particular claim element, a baseband integrated circuit for an access node or a terminal device or other computing or network device.

In embodiments, the at least one processor, the memory, and the computer program code form processing means or comprises one or more computer program code portions for carrying out one or more operations according to any one of the embodiments of FIGS. 2, 3, 4A, 4B and 5 or operations thereof.

In an embodiment, at least some of the processes described in connection with of FIGS. 2, 3, 4A, 4B and 5 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 2, 3, 4A, 4B and 5 or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chipset (procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 2, 3, 4A, 4B and 5 may be carried out by executing at least one portion of a computer program comprising corresponding instructions. The computer program may be provided as a computer readable medium comprising program instructions stored thereon or as a nontransitory computer readable medium comprising program instructions stored thereon. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to examples according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus for a wearable terminal device comprising:
at least one processor; and
at least one non-transitory memory storing instructions that, when executed with the at least one processor, cause the apparatus to perform:
receiving, via a bone conduction sensor, a bone conduction signal;
receiving, via at least one microphone over the air, an audio signal, wherein the bone conduction signal and the audio signal are, at least in part, substantially concurrently recorded signals;
calculating a value of a similarity metric for evaluating an extent of similarity between the bone conduction signal and the audio signal; and
in response to the value of the similarity metric exceeding a pre-defined threshold indicating that the bone conduction signal and the audio signal relate, at least in part, to a same segment of sound originating from a mouth of a user of the wearable terminal device, causing performing one or more actions,
wherein, when the at least one microphone consists of a single microphone, the one or more actions comprise:
executing, in response to detecting a voice command in at least one of the audio signal or the bone conduction signal, the voice command, or
wherein, when the at least one microphone comprises a plurality of microphones, the one or more actions comprise at least one of:

executing, in response to detecting a voice command in at least one of the audio signal or the bone conduction signal, the voice command; or modifying one or more audio focusing parameters of the plurality of microphones for increasing the value of the similarity metric.

2. The apparatus of claim 1, wherein the one or more actions comprise performing the following in response to detecting the voice command in said at least one of the audio signal or the bone conduction signal:

estimating a distance of a mouth of the user from the wearable terminal device based on signal levels and/or delays of the audio signal and the bone conduction signal; and in response to the distance being within a first pre-defined distance range, executing the voice command based on the audio signal and/or the bone conduction signal with performing a first function; and/or in response to the distance being within a second pre-defined distance range at least partially different from the first pre-defined distance range, executing the voice command based on the audio signal and/or the bone conduction signal with performing a second function different from the first function or ignoring the voice command.

3. The apparatus of claim 2, wherein one of the first and second pre-defined distance ranges is defined to be from zero to a first pre-defined upper distance and the other of the first and second pre-defined distance ranges is de-fined to be above the first pre-defined upper distance.

4. The apparatus of claim 3, wherein, when the voice command is of a first type, the first function is causing displaying information on a screen of the wearable terminal device and/or the second function is playing a sound or speech via at least one speaker comprised in or electrically or communicatively connected to the wearable terminal device, said information or said sound or speech being dependent on the voice command.

5. The apparatus of claim 3, wherein, when the voice command is of a second type, the first function is directly executing the voice command and/or the second function is causing displaying information on a screen of the wearable terminal device, said information being dependent on the voice command.

6. A wearable terminal device comprising the apparatus according to claim 1, wherein the wearable terminal device is adapted to be worn around a wrist, on a hand, around a finger or on an arm.

7. A wearable terminal device according to claim 6, wherein the wearable terminal device is earphones, an earpiece or is adapted to be worn around a head or around a neck.

8. An apparatus comprising:

at least one processor; and at least one non-transitory memory storing instructions that, when executed with the at least one processor, cause the apparatus to perform:

receiving, via at least one microphone over the air or via at least one communication link or network from a wearable terminal device, an audio signal;

receiving, via at least one communication link or network from a wearable terminal device comprising a bone conduction sensor, a bone conduction signal, wherein the bone conduction signal and the audio signal are, at least in part, substantially concurrently recorded signals;

calculating a value of a similarity metric for evaluating an extent of similarity between the bone conduction signal and the audio signal; and in response to the value of the similarity metric exceeding a pre-defined threshold indicating that the bone conduction signal and the audio signal relate, at least in part, to a same segment of sound originating from a mouth of a user of the wearable terminal device, causing performing one or more actions, wherein, when the at least one microphone consists of a single micro-phone, the one or more actions comprise:

executing, in response to detecting a voice command in at least one of the audio signal or the bone conduction signal, the voice command, or wherein, when the at least one microphone comprises a plurality of microphones, the one or more actions comprise at least one of:

executing, in response to detecting a voice command in at least one of the audio signal or the bone conduction signal, the voice command; or modifying one or more audio focusing parameters of the plurality of microphones for increasing the value of the similarity metric.

9. An apparatus of claim 8, wherein the apparatus is, or is part of, a smart speaker, a mobile phone, a desktop computing device, a laptop computing device, a touch-based computing device, a camera or a computing device for a vehicle.

10. A system comprising:

a terminal device comprising the apparatus of claim 8; and the wearable terminal device, wherein the wearable terminal device is configured to perform:

receiving, via the bone conduction sensor of the wearable terminal device, a bone conduction signal; and transmitting the bone conduction signal to the terminal device via said at least one wireless or wired communication link or network.

11. The system of claim 10, wherein the wearable terminal device is configured to perform:

receiving, via at least one microphone over the air, an audio signal, wherein the bone conduction signal and the audio signal are, at least in part, concurrently recorded signals; and transmitting the audio signal to the terminal device via said at least one wireless or wired communication link or network.

12. An apparatus according to claim 1, wherein the similarity metric is a cross-correlation metric.

13. The apparatus according to claim 1, wherein the instructions, when executed with the at least one processor, cause the apparatus to perform, before the calculating of the value of the similarity metric:

synchronizing the bone conduction signal and the audio signal assuming a pre-defined expected maximum delay window.

14. A method comprising:

receiving, via a bone conduction sensor, a bone conduction signal;

receiving, via at least one microphone over the air, an audio signal, wherein the bone conduction signal and the audio signal are, at least in part, substantially concurrently recorded signals;

calculating a value of a similarity metric for evaluating an extent of similarity between the bone conduction signal and the audio signal; and in response to the value of the similarity metric exceeding a pre-defined threshold indicating that the bone conduction signal and the audio signal relate, at least in part, to a same segment of sound originating from a mouth of a user of a wearable terminal device, causing performing one or more actions, wherein, when the at least one microphone consists of a single microphone, the one or more actions comprise:
executing, in response to detecting a voice command in at least one of the audio signal or the bone conduction signal, the voice command, or wherein, when the at least one microphone comprises a plurality of microphones, the one or more actions comprise at least one of:
executing, in response to detecting a voice command in at least one of the audio signal or the bone conduction signal, the voice command;
modifying one or more audio focusing parameters of the plurality of microphones for increasing the value of the similarity metric.

15. A method comprising:
receiving, via at least one communication link or network from a wearable terminal device comprising a bone conduction sensor, a bone conduction signal, wherein the bone conduction signal and an audio signal are, at least in part, substantially concurrently recorded signals;
calculating a value of a similarity metric for evaluating an extent of similarity between the bone conduction signal and the audio signal; and
in response to the value of the similarity metric exceeding a pre-defined threshold indicating that the bone conduction signal and the audio signal relate, at least in part, to a same segment of sound originating from a mouth of a user of the wearable terminal device, causing performing one or more actions, wherein, when the at least one microphone consists of a single microphone, the one or more actions comprise:
executing, in response to detecting a voice command in at least one of the audio signal or the bone conduction signal, the voice command, or wherein, when the at least one microphone comprises a plurality of microphones, the one or more actions comprise at least one of:
executing, in response to detecting a voice command in at least one of the audio signal or the bone conduction signal, the voice command;
modifying one or more audio focusing parameters of the plurality of microphones for increasing the value of the similarity metric.

16. A computer program product, embodied on a non-transitory computer readable medium, comprising program instructions, that when run is adapted to perform the method as claimed in claim 14.

17. A computer program product, embodied on a non-transitory computer readable medium, comprising program instructions, that when run is adapted to perform the method as claimed in claim 15.

* * * * *